No. 682,487. F. NACHTIGAL. Patented Sept. 10, 1901.
MACHINE FOR CUTTING CORN OR THE LIKE.
(Application filed Jan. 18, 1900.)
(No Model.) 2 Sheets—Sheet 1.
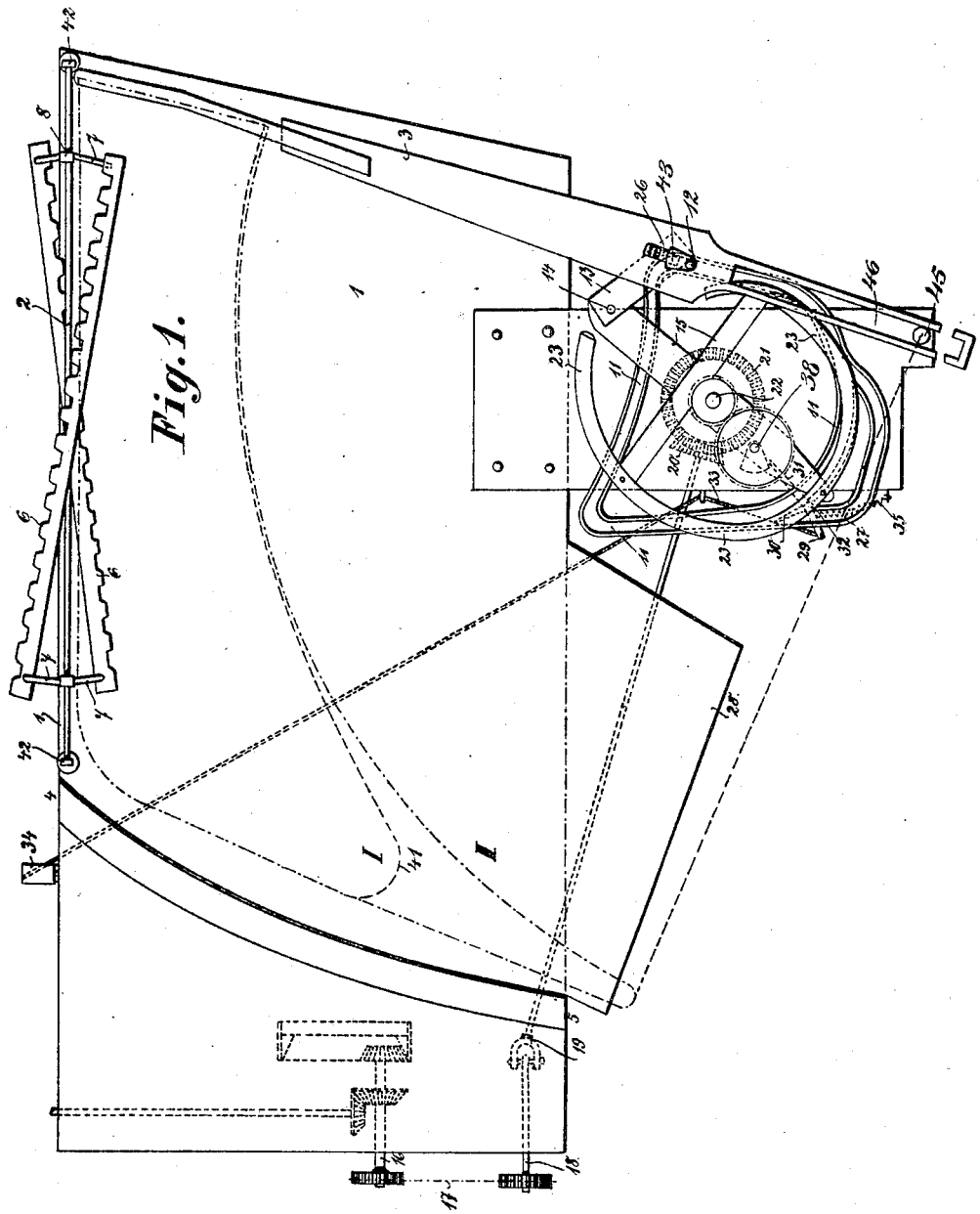
Witnesses
Paul Hunter
John Lotka
Inventor
Franz Nachtigal
By Munn
Attorneys
THE NORRIS PETERS CO., PHOTO-LITHO., WASHINGTON, D. C.

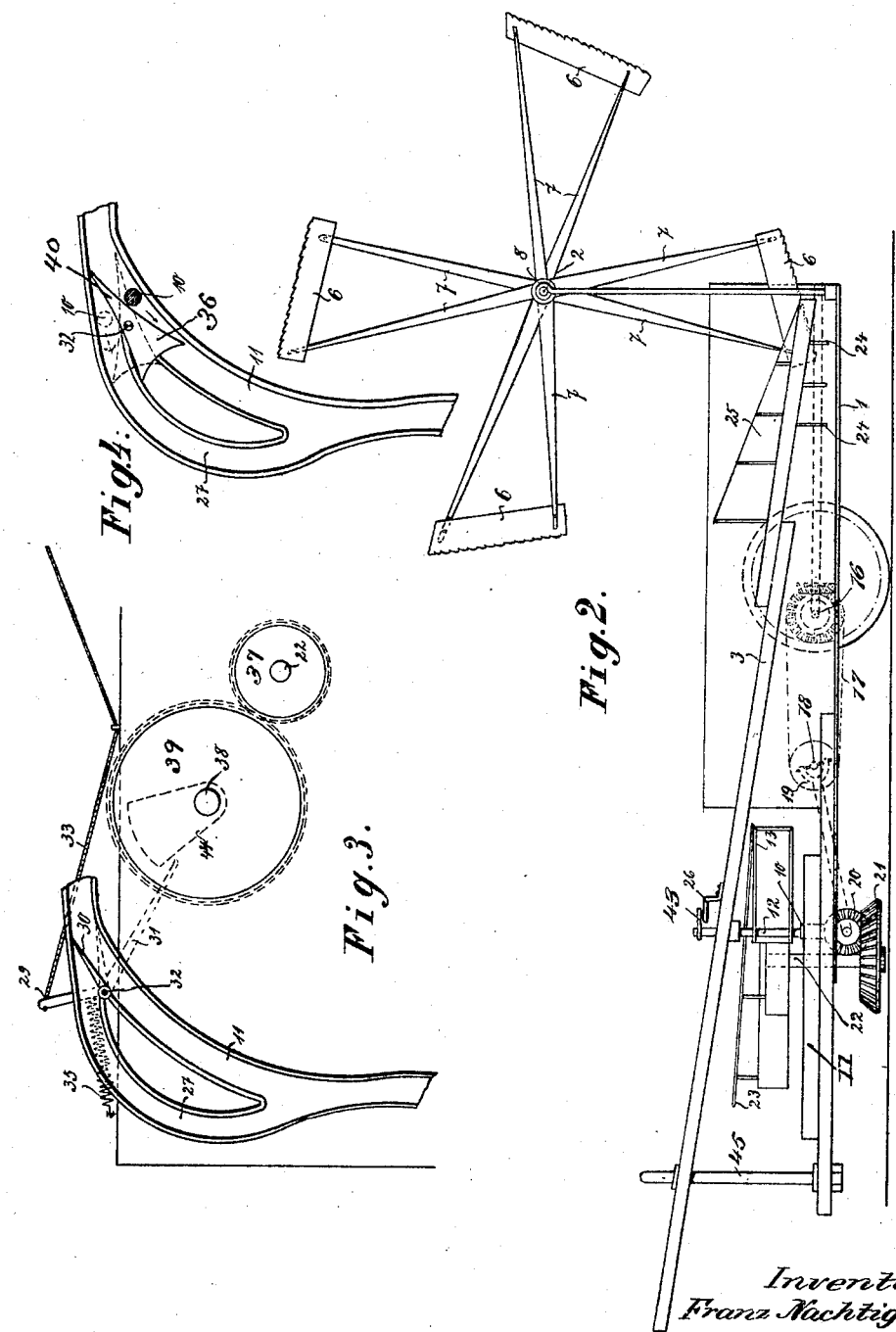

UNITED STATES PATENT OFFICE.

FRANZ NACHTIGAL, OF ALEXANDROWSK, RUSSIA.

MACHINE FOR CUTTING CORN OR THE LIKE.

SPECIFICATION forming part of Letters Patent No. 682,487, dated September 10, 1901.

Application filed January 18, 1900. Serial No. 1,902. (No model.)

*To all whom it may concern:*

Be it known that I, FRANZ NACHTIGAL, a subject of the King of Prussia, German Emperor, residing at Alexandrowsk, Ekatherinoslaw, in the Empire of Russia, have invented certain new and useful Improvements in Machines for Cutting Corn or the Like, of which the following is a specification.

The machines hitherto used for cutting corn and the like are mostly very complicated in construction and do not work quickly enough to be used for extensive areas, and when used for smaller areas such machines occasion the laborer great inconvenience and annoyance in consequence of the difficulty experienced in mastering their construction. Reference may be made to the automatic agricultural machines now used, in which four or five rakes bring the corn to the knives and remove it at will, or automatically from the table or to the binder, (automatic sheaves-binder,) in which the cut corn is conducted by three elevators over the main wheel to the binding apparatus. The arrangement of the rakes in the automatic agricultural machines only enables a relatively narrow surface of action, and thereby prevents a large useful effect. Further, the iron parts of the rakes are subjected to great wear by the rolling motion, not to mention the breakages which so frequently occur. These disadvantages have caused farmers—as, for example, in Russia—to use the simple reel-cutting machines in preference to all others, even although the laborer must sit at the back of these machines to rake down the corn at a great expenditure of manual power. By the present invention these disadvantages are removed, as corn, no matter what position it may have, can be properly fed to the knives by an improved construction of the reel and removed from the table or conducted to a binder by a rake driven by simple mechanism.

In the accompanying drawings, Figure 1 is a plan, and Fig. 2 a side elevation. Fig. 3 shows two forms of the reversing device for the face-cam, the automatic device being shown in dotted lines. Fig. 4 shows a second form of construction of the automatic reversing device for the double-face cam.

1 is the table on which the corn or the like cut by the knives falls.

2 is the reel by which the corn is approached to the knives.

3 is the rake by which the corn is removed from the table.

The table 1 is somewhat rounded off at 4 and 5, so that the stalks when being removed may lie parallel to the rake and be more easily removed. On the table the supports 42 for the axle of the reel are secured. The end bars 6 of the reel are arranged at an angle to their radial arms 7 and are further twisted somewhat spirally. To enable this to be done, it is sufficient if the one boss 8 of the arm 7 is made adjustable with regard to the axle, by which means a twist to the right or left is obtained, according to the direction of the corn. This arrangement of the bars is of great importance for the good operation of the machine, as is shown further below.

The corn brought to the knives by the reel and cut by the former is removed from the table by the rake 3. The rake, which is provided with tines 24 at the bottom and with a comb 25 at the top, so that the corn cannot rise over the same, but is pushed forward, is fulcrumed on the axle 12, which is constrained by the roller 10 to move in the curve 11. The axle 12 of the roller 10 is connected to a bar 13, which is secured at 14 to a cross-piece or spider 15, driven from the axle of the machine. The axle 16 drives an axle 18 by the chain 17, and the motion is transferred from the axle 18 to the axle 22 of the cross-piece 15 by the universal joint 19 and bevel-gearing 20 21. The cross-piece 15 is further connected with an inclined gallery 23, so that on the cross-piece rotating the rake remains in contact with the table when removing the corn and is raised at the return stroke. The gallery is not closed, as will be seen from the drawings, as if it were the movement of the bar 13 would be interfered with. For this reason an angle-piece 26 is provided on the rake, which bears underneath a stop 43 on the axle 12, so that the rake cannot rise on leaving the gallery 23. The rear end of the rake 3 is guided by the engagement of a stationary pin 45 with the walls of a longitudinal slot 46 in the rake. The rake can describe the two different paths indicated in dotted lines at I and II in Fig. 1. Path I is described when a sheaves-binder is provided on the machine, and it is then sufficient to form the face-cam with a single groove. If, however, the grain is to be entirely removed from the table, the face-cam must have a double groove—that is, the roller 10 must be branched off into a groove 27, so that the rake can swing over to the opposite edge of the table. For the complete removal of the corn—that is, when no sheaves-binder is provided—the table must be lengthened toward the back, as otherwise there would not be sufficient room for the loose corn and it would be thrown off. When, however, a sheaves-binder is used, this lengthened part 28 is unnecessary. For the adjustment for the second groove 27 of the face-cam 11 a two-armed lever 29 30 is provided, which can rotate on the pin 32. The arm 29 is connected to a tie 33 of some kind, connected at the other end to a lever 34, which can be actuated by foot. The lever 29 30 is kept in the normal position by a spring 35, Fig. 3. This lever 29 30 can also be automatically actuated for the second groove 27 of the face-cam 11 by providing a spur-wheel 37 on the axle 22 of the cross-piece 15, in which a spur-wheel 39 on the pin 38 engages. A cam 44 on the pin 38 actuates the lever 29 30, which is under the action of the spring 35, bringing the roller into the second groove 27. A second form of construction of this reversing device is shown in Fig. 4. On the pin 32 a three-armed star-piece 36 is arranged the sides of which are so situated that when the roller 10 bears against one of the same the further motion of the roller will cause the star-piece to turn on the pin 32 and adjust the point 40 of the star for the other groove. When, therefore, the roller 10, moving in the groove 11 after the adjustment of the lever 29 30, is switched into the groove 27, the rake describes the path II—that is, it sweeps over the entire table. If, however, the roller 10 only moves in the groove 11, the rake 3 heaps up the corn at the point 41 of the path I, from whence it is taken up by the sheaves-binder and bound. By arranging the bars 6 of the reel at an angle to the arms 7 they catch below the cumbent corn and raise same. The spiral turn is of significance when the corn lies more or less at an angle to the cutters. The direction of the spiral turn is to the right or left, according to the direction of the corn. The teeth on the bars prevent the corn from slipping off when it is inclined to the right or left with regard to the table.

What I claim, and desire to secure by Letters Patent of the United States, is—

1. The combination of the supporting-table, the rake adapted to sweep over the table, the stationary post with which the rake has a sliding pivotal connection, the spindle projected from the rake at a distance from said post, the stationary guide provided with a runway for said spindle, means for causing the spindle to travel along said runway, and an inclined gallery or support arranged to govern the inclination of the rake relatively to the table.

2. The combination of the supporting-table, the rake adapted to sweep over the table, the stationary post with which the rake has a sliding pivotal connection, the spindle projected from the rake at a distance from said post, the rake being loosely mounted on the spindle so as to be capable of swinging up and down thereon, the stationary guide provided with a runway for said spindle, means for causing the spindle to travel along said runway, and an inclined gallery or support arranged to govern the inclination of the rake relatively to the table.

3. The combination of the supporting-table, the rake adapted to sweep over the table, the stationary post with which the rake has a sliding pivotal connection, the spindle projected from the rake at a distance from said post, the stationary guide provided with a runway for said spindle, means for causing the spindle to travel along said runway, and an inclined gallery-support held to rotate and arranged to govern the inclination of the rake relatively to the table.

4. The combination of the supporting-table, the rake adapted to sweep over the table, the stationary post with which the rake has a sliding pivotal connection, the spindle projected from the rake at a distance from said post, the stationary guide provided with a runway for said spindle, a rotary driving device for causing said spindle to travel along said runway, and an inclined segmental gallery or support arranged to rotate with said driving device and to govern the inclination of the rake relatively to the table, said driving device passing between the ends of the gallery.

5. The combination of the supporting-table, the rake adapted to sweep over the table, the stationary post with which the rake has a sliding pivotal connection, the spindle projected from the rake at a distance from said post, the stationary guide provided with a runway for said spindle, a rotary driving device for causing said spindle to travel along said runway, and an inclined segmental gallery or support arranged to rotate with said driving device and to govern the inclination of the rake relatively to the table, said driving device passing between the ends of the gallery, the rake and the spindle being provided with projections arranged to engage each other at the time the rake is between the ends of the gallery, to prevent upward movement of the rake at that time.

6. The combination of the supporting-table, the rake adapted to sweep over the table, a driving device for the rake, a continuous guide having a runway engaged by a projection on the rake, said runway having at one point two branches in substantially the same horizontal plane, but at different distances from the center of the guide, a switch for causing the projection of the rake to pass into one or the other branch of the runway, to lengthen or shorten the path of the rake, and means for throwing said switch.

7. The combination of the supporting-table, the rake adapted to sweep over the table, a driving device for the rake, a continuous guide having a runway engaged by a projection on the rake, said runway having at one point two branches in substantially the same horizontal plane, but at different distances from the center of the guide, a switch for causing the projection of the rake to pass into one or the other branch of the runway, to lengthen or shorten the path of the rake, and a switch-throwing device, operatively connected with the driving device of the rake, for causing the projection of the rake to pass alternately into the two branches of the runway.

8. The combination of the supporting-table, the rake adapted to sweep over the table, the stationary post with which the rake has a sliding pivotal connection, the spindle projected from the rake at a distance from said post, the stationary guide provided with a runway for said spindle, said runway having at one point two branches in substantially the same horizontal plane, but at different distances from the center of the guide, a switch for causing the rake-spindle to pass into one or the other branch of the runway, to lengthen or shorten the path of the rake, a device for driving the rake, and means for throwing said switch.

9. The combination of the supporting-table, the rake adapted to sweep over the table, the stationary post with which the rake has a sliding pivotal connection, the spindle projected from the rake at a distance from said post, the stationary guide provided with a runway for said spindle, said runway having at one point two branches in substantially the same horizontal plane, but at different distances from the center of the guide, a switch for causing the rake-spindle to pass into one or the other branch of the runway, to lengthen or shorten the path of the rake, a device for driving the rake, and a switch-throwing device, operatively connected with the driving device of the rake, for causing the projection of the rake to pass alternately into the two branches of the runway.

In testimony whereof I have hereunto set my hand in the presence of two witnesses.

FRANZ NACHTIGAL.

Witnesses:
THOMAS E. HEENAN,
THOMAS MILES.